Patented Aug. 15, 1933

UNITED STATES PATENT OFFICE 1,922,743

SYNTHETIC RESIN AND PROCESS OF MAKING

Charles G. Moore and Edwin H. Drake, Lakewood, Ohio, assignors to The Glidden Company, Cleveland, Ohio, a Corporation of Ohio No Drawing. Application August 1, 1931
Serial No. 554,595

6 Claims. (Cl. 260—8)

In United States Patent No. 1,812,639, there is set forth the making of synthetic resins by reacting between a polybasic acid, a polyhydric alcohol, and rubber seed fatty acid. We have now found however, that glycerides, as for example rubber seed oil, etc., can be directly employed in the making of synthetic resins by proper procedure, and this makes possible not only new and different results, but also affords important practical advantages.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

In accordance with the invention, a glyceride, an organic polybasic acid, a polyhydric alcohol, and a fatty acid are treated under reaction conditions. For the polybasic acid, we may employ phthalic anhydride, succinic acid, citric acid, and the like, and for the polyhydric alcohol we may employ glycerol, polyglycerol, glycol, polyglycol, and the like. Generally, phthalic anhydride and glycerol are most desirable.

The glyceride may be a non-drying oil, a drying oil, for instance ruber seed oil, soya bean oil, linseed oil, tung oil, etc., and the fatty acid may be such as derived from such oil, as for instance the fatty acids of rubber seed oil, linseed oil, soya bean oil, tung oil, or other fatty acids such as oleic acid may be employed in some instances. Preferably, we employ rubber seed oil, and rubber seed acid. The proportions may vary somewhat, and insofar as the oil and the fatty acids are concerned, may range for instance on the order of 40 to 60 per cent of oil, and 40 to 60 per cent fatty acid. The reaction mixture is heated to esterification, water being eliminated.

As an example: rubber seed oil, phthalic anhydride, glycerol, and rubber seed oil acids are heated together in a suitable container, such as a varnish kettle, in proportions for instance of 2.55 parts of rubber seed oil, 6.75 parts of phthalic anhydride, 4.3 parts of 95 per cent glycerol, and 3.2 parts of rubber seed oil fatty acids, all by weight. The temperature is raised rapidly, to about 175° C. The time required to reach such temperature will vary from a half to an hour, depending upon the size of the batch, and the fire. After esterification begins, considerable frothing is manifest, and the heating should not be pushed then too rapidly. The temperature is then slowly run up to about 250° C. over a period of about forty-five minutes to an hour. The esterification is now well along and polymerization begins. If the polymerization be carried too far, a point is reached where an exothermic reaction sets in and the mass jells. The polymerization can be continued however, for 40 to 90 minutes without detriment. Sampling is carried on, and when a test sample shows that the resin is free from tackiness and fairly tough on being cut by a knife, the heating is discontinued. The resin may be poured out and cooled and be dissolved later, or it can be dissolved hot in the kettle. Suitable solvents are hydrocarbons, as benzol, toluol, petroleum naphtha, etc. Alcohols, ethers and esters can also be used. Such a resin when made up and applied as a varnish or paint coating, has superior drying qualities, forming a tough, hard film free from tackiness and poor setting.

Other modes of applying the principle of the invention may be employed, change being made as regards the details disclosed, provided the constitutents or steps stated in any of the following claims, or the equivalent of such, be employed.

We therefore particularly point out and distinctly claim as our invention:—

1. A synthetic resin, comprising the reaction product of an organic polybasic acid, polyhydric alcohol, rubber-seed oil, and fatty acid.

2. A synthetic resin comprising the reaction product of rubber-seed oil, phthalic anhydride, a polyhydric alcohol, and fatty acid.

3. A synthetic resin, comprising the reaction product of phthalic anhydride, glycerol, rubber seed oil, and rubber seed oil acids in the proportions of about 6.75 parts of phthalic anhydride; about 4.3 parts of 95 per cent glycerol; about 2.55 parts of rubber seed oil, and about 3.2 parts of rubber seed oil acid, all by weight.

4. A process of making synthetic resin, which comprises reacting between an organic polybasic acid, a polyhydric alcohol, rubber seed oil, and a fatty acid.

5. A process of making synthetic resin which comprises reaction between rubber-seed oil, phthalic anhydride, a polyhydric alcohol, and a fatty acid.

6. A process of making synthetic resin, which comprises reacting between phthalic anhydride, glycerol, rubber seed oil, and rubber seed oil acids, in proportions of about 6.75 parts of phthalic anhydride; about 4.3 parts of 95 per cent glycerol; about 2.55 parts of rubber seed oil, and about 3.2 parts of rubber seed oil acid, all by weight.

CHARLES G. MOORE.
EDWIN H. DRAKE.